United States Patent
Hilland et al.

(10) Patent No.: US 7,757,232 B2
(45) Date of Patent: Jul. 13, 2010

(54) METHOD AND APPARATUS FOR IMPLEMENTING WORK REQUEST LISTS

(75) Inventors: Jeffrey R. Hilland, Cypress, TX (US); Mallikarjun Chadalapaka, Roseville, CA (US); Michael R. Krause, Boulder Creek, CA (US); Paul R. Culley, Tomball, TX (US); David J. Garcia, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1511 days.

(21) Appl. No.: 10/641,129

(22) Filed: Aug. 14, 2003

(65) Prior Publication Data

US 2005/0038918 A1     Feb. 17, 2005

(51) Int. Cl.
- *G06F 9/46* (2006.01)
- *G06F 15/16* (2006.01)
- *G06F 15/167* (2006.01)

(52) U.S. Cl. .................. 718/100; 718/101; 709/212; 709/232; 709/250; 710/308; 710/310

(58) Field of Classification Search .............. 710/310, 710/313; 719/312; 709/227, 250, 226, 232; 718/100–108
See application file for complete search history.

(56) References Cited

U.S. PATENT DOCUMENTS

| | | | |
|---|---|---|---|
| 5,325,532 A | 6/1994 | Crosswy et al. | |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,978,858 A | 11/1999 | Bonola et al. | |
| 5,983,269 A | 11/1999 | Mattson et al. | |
| 6,018,620 A | 1/2000 | Culley et al. | |
| 6,038,621 A | 3/2000 | Gale et al. | |
| 6,047,323 A | 4/2000 | Krause | |
| 6,070,198 A | 5/2000 | Krause et al. | |

(Continued)

FOREIGN PATENT DOCUMENTS

EP      0757318 A2    2/1997

OTHER PUBLICATIONS

Recio, "RDMA Enabled NIC (RNIC) Verbs Overview", RDMACONSORTIUM.ORG, Apr. 29, 2003, pp. 1-28.*

(Continued)

*Primary Examiner*—Meng-Ai An
*Assistant Examiner*—Jennifer N To

(57) ABSTRACT

An apparatus employs a work request list to access a memory device. The apparatus comprises an upper layer protocol that generates the work request list comprising a plurality of work requests, the work request list having an attribute that indicates the number of the plurality of work requests in the work request list. The apparatus additionally comprises an interface that is adapted to receive the work request list and individually enqueue the plurality of work requests.

11 Claims, 5 Drawing Sheets

U.S. PATENT DOCUMENTS

| | | | |
|---|---|---|---|
| 6,070,253 | A | 5/2000 | Tavallaei et al. |
| 6,157,967 | A | 12/2000 | Horst et al. |
| 6,163,834 | A | 12/2000 | Garcia et al. |
| 6,233,702 | B1 | 5/2001 | Horst et al. |
| 6,289,023 | B1 | 9/2001 | Dowling et al. |
| 6,502,203 | B2 | 10/2002 | Barron et al. |
| 6,484,208 | B1 | 11/2002 | Hilland |
| 6,493,343 | B1 | 12/2002 | Garcia et al. |
| 6,496,940 | B1 | 12/2002 | Horst et al. |
| 6,721,806 | B2 * | 4/2004 | Boyd et al. ............ 719/312 |
| 6,742,075 | B1 * | 5/2004 | Bailey et al. ........... 710/310 |
| 7,003,616 | B2 * | 2/2006 | Shimura ................ 710/313 |
| 7,076,569 | B1 * | 7/2006 | Bailey et al. ........... 709/250 |
| 7,165,110 | B2 * | 1/2007 | Neal et al. ............. 709/227 |
| 7,177,941 | B2 * | 2/2007 | Biran et al. ............ 709/232 |
| 7,281,030 | B1 * | 10/2007 | Davis .................... 709/212 |
| 2002/0152327 | A1 * | 10/2002 | Kagan et al. ........... 709/250 |
| 2003/0018787 | A1 * | 1/2003 | Neal et al. ............. 709/227 |
| 2004/0049580 | A1 * | 3/2004 | Boyd et al. ............ 709/226 |

OTHER PUBLICATIONS

U.S. Appl. No. 10/400,313, filed Mar. 27, 2003, entitled Protection Domain Group, Inventors: Jeffrey R. Hilland et al.

U.S. Appl. No. 10/401,234, filed Mar. 27, 2003, entitled Queue Pair/Window Association, Inventors: David J. Garcia et al.

U.S. Appl. No. 10/401,232, filed Mar. 27, 2003, entitled Physical Mode Addressing, Inventors: Kathryn Hampton et al.

U.S. Appl. No. 10/401,230, filed Mar. 27, 2003, entitled Physical Mode Windows, Inventors: David J. Garcia et al.

U.S. Appl. No. 10/401,237, filed Mar. 27, 2003, entitled Method and Apparatus for Performing Connection Management with Multiple Stacks, Inventors: Prashant Modi et al.

U.S. Appl. No. 10/401,233, filed Mar. 27, 2003, entitled Atomic Operations, Inventors: Dwight L. Barron et al.

U.S. Appl. No. 10/401,237, filed Mar. 27, 2003, entitled Signaling Packet, Inventor: Dwight L. Barron.

U.S. Appl. No. 10/401,231, filed Mar. 27, 2003, entitled Shared Receive Queues, Inventors: Mallikarjun Chadalapaka et al.

U.S. Appl. No. 10/401,235, filed Mar. 27, 2003, entitled Binding A Memory Window to A Queue pair, Inventors: David J. Garcia et al.

U.S. Appl. No. 10/401,236, filed Mar. 27, 2003, entitled Signaling Packet, Inventor: Dwight L. Barron.

Jeffrey R. Hilland et al., "RDMA Protocol Verbs Specification (Version 1.0)" (Apr. 2003).

* cited by examiner

METHOD AND APPARATUS FOR IMPLEMENTING WORK REQUEST LISTS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. Work requests may be issued from an upper layer protocol or a consumer to a QP to define the segment of the local memory to be exposed to a remote system. The work queue, which may be represented by a work queue element, may be enqueued into the send or receive queue, when the work request is received from the upper layer protocol or consumer of the QP. Once the work request is received, the hardware is notified for each individual work request. Upon completion of the work request, the work queue element that represents the work request may be dequeued and another work queue element may be processed However, in communicating the work request to the QP, an Input/Output (I/O) bus may be utilized to retrieve the work queue elements in a singular fashion. The queuing and notification process may result in inefficient utilization of the I/O bus because the QP may retrieve the work queue elements multiple times. As such, queuing and notification process may be time consuming and expensive in terms of computing resources.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification correspond to commands or actions that form a command interface for data transfers between memories in computer systems, including the formation and management of queue pairs, memory windows, protection domains and the like.

In general, RDMA refers to the ability of one computer to directly place information in the memory space of another computer, while minimizing demands on the central processing unit ("CPU") and memory bus. In an RDMA system, an RDMA layer interoperates over any physical layer in a Local Area Network ("LAN"), Server Area Network ("SAN"), Metropolitan Area Network ("MAN"), or Wide Area Network ("WAN").

Figure 1:
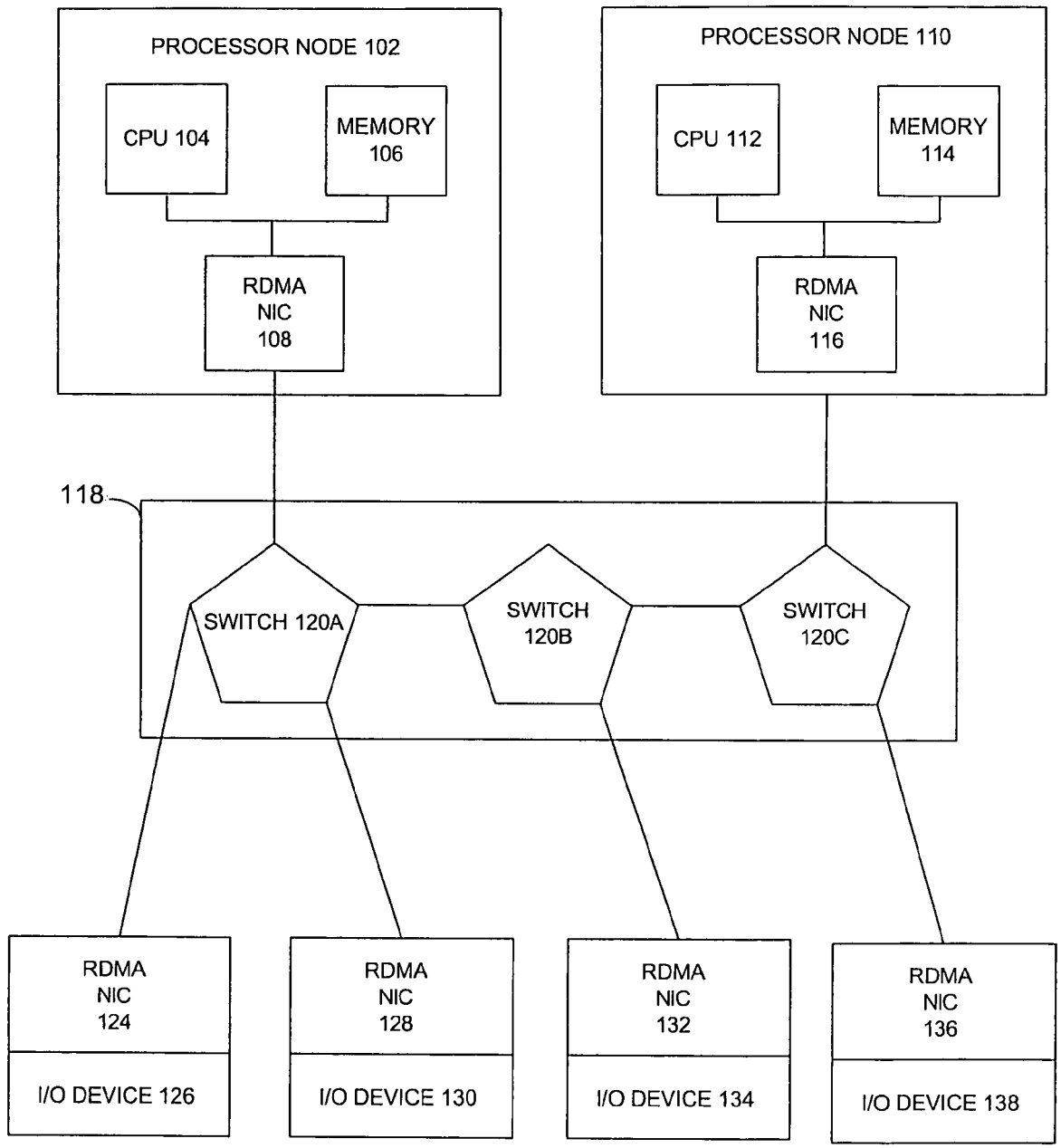
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and comprises a first processor node 102 and a second processor node 110, which are be connected to a plurality of I/O devices 126, 130, 134, and 138 via a switch network 118. Each of the I/O devices 126, 130, 134 and 138 utilizes a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118. The I/O devices 126, 130, 134, and 138 may comprise a traditional I/O device, a bridge, a router, a loopback device, or other translation device.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 is connected to the memory 106 and the RNIC 108 over an internal bus or connection. The memory 106 is utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, is connected to the memory 114 and the RNIC 116 over an internal bus or connection. The memory 114 is utilized to store information for use by the CPU 112, the RNIC 116 or other systems or devices. The memory 114 may utilize various types of memory such as SRAM or DRAM.

The switch network 118 may include any combination of hubs, switches, routers, point to point links, and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
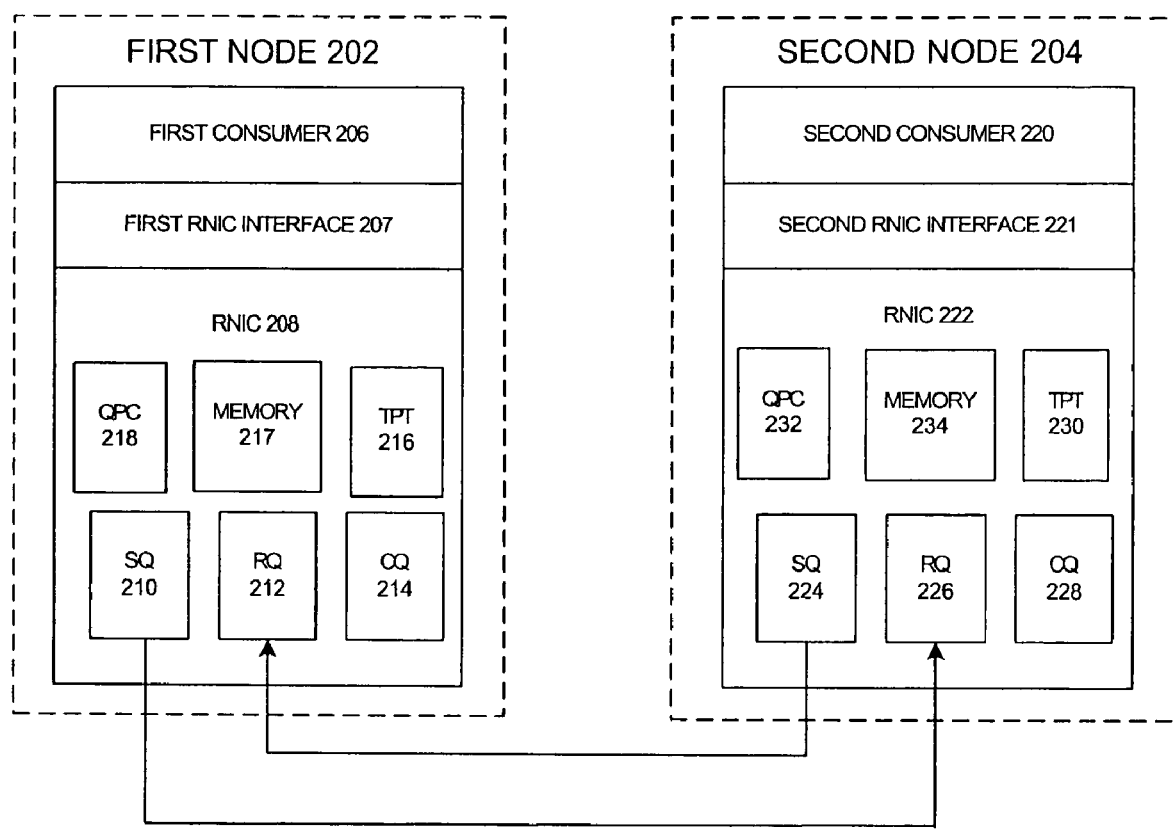
FIG. 2 is a block diagram illustrating a simplified exchange between computers in a computer network in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 includes a first consumer 206, which interacts with an RNIC 208. The first consumer 206 comprises a software, firmware, or silicon process that may interact with various components of the RNIC 208 through an RNIC interface 207 ("RI"). The RI 207 manages the interaction between the first consumer 206 and the RNIC 208 by managing the RNIC services that may be specified by different verbs. These verbs relate to the creation and management of the RNIC 208 and interaction between the RNIC 208 and the first consumer 206. The RNIC 208, which corresponds to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218.

The second node 204 includes a second consumer 220, which interacts with an RNIC 222. The second consumer 220 may comprise a software, firmware, or silicon process that may interact with various components of the RNIC 222 through an RI 221. The RI 221 manages the interaction between the second consumer 220 and the RNIC 222 by managing the RNIC services. The RNIC 222, corresponds to one of the RNICs 108, 116, 126, 130, 134 or 138 (FIG. 1), depending on which of devices associated with those RNICs is participating in the data transfer. The RNIC 222 comprises a send queue 224, a receive queue 226, a completion queue 228, a TPT 230, a memory 234 and a QP context 232.

The memories 217 and 234 may be registered to different processes, each of which may correspond to the consumers 206 and 220. The memories 217 and 234 may comprise a portion of the main memory of the nodes 202 and 204, memory within the RNICs 208 and 222, or other memory associated with the nodes 202 and 204. The queues 210, 212, 214, 224, 226, or 228 are used to transmit and receive various verbs or commands, such as control operations or transfer operations. The completion queue 214 or 228 may store information regarding the sending status of items on the send queue 210 or 224 and receiving status of items on the receive queue 212 or 226. The TPT 216 or 230 may comprise a simple table or an array of page specifiers that may include a variety of configuration information in relation to the memories 217 or 234.

The QP associated with the RNIC 208 comprises the send queue 210 and the receive queue 212. The QP associated with the RNIC 222 comprises the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs are established and configured by an exchange of commands or verbs between the RNIC 208 and the RNIC 222, as well as the consumers 206 or 220 and RNICs 208 or 222, respectively. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs. Access rights may be verified and a connection path may be established between the RNICs 208 and 222 by mapping a QP at each node 202 and 204 together.

To perform operations in the nodes 202 and 204, such as accessing one of the memories 217 and 234, the consumer 206 or 220 may issue a command that may include a work request ("WR") to the RI 207 or 221. The consumer 206 or 220 may create a WR by issuing a verb, such as a "POST RQ" verb or a "POST SQ" verb. The WR may include an user defined work request identification, a scatter/gather list ("SGL"), a number of WRs within the request, a number of SGL elements or entries, and other information to support the command being issued. The SGL may also include a steering tag ("STag"), a tagged offset, a length and the like. The STag may be used to identify a buffer that is being referenced for a given data transfer. A tagged offset may be associated with the STag and may correspond to an offset into the associated buffer. The STag and the tagged offset may be used to reference an entry in the TPT 216 or 230 to access a segment of the memories 217 and 234. The submission of a WR to the RI 207 or 221 results in the creation of a work queue element ("WQE") that is to be posted to a work queue, which may be one of the send queues 210 or 224 or the receive queues 212 or 226. The WQE may be an internal representation of the work request within the RI 207 or 221.

In operation, various WRs may be issued from the consumer 206 or 220 to the RI 207 or 221. With each of these WRs, various actions and notifications may be performed to execute the WR. For instance, if the first consumer 206 issues a "PostRQ" verb, then a WR may be delivered to the RI 207. The RI 207 may receive the WR and build a first WQE that relates to the WR. The RI 207 may enqueue the WQE at the end of the RQ 212. Once the WQE is created, a doorbell may be rung by the RI 207 to indicate to the RNIC 208 that a WQE has been posted on the RQ 212. The doorbell may be a message or indication that includes a target address and value for the number of WQEs that were posted. Once the RNIC is notified through the doorbell, the RNIC 208 may retrieve the WQE through an I/O bus. If a second WR is sent to the RI 207, a second WQE may be posted to the RQ 212. This second WQE may result in the ringing of a second doorbell and a second retrieval of the second WQE. As such, a doorbell ring and an associated hardware retrieval may occur for each WR that is received at the RNIC 208.

To optimize these transactions, a work request list ("WRL") may be implemented to improve the efficiency of this operation. With a work request list, multiple work requests may be bundled together as a unit to be issued to the RI from the consumer. By bundling the work requests together, the overhead associated with each doorbell ring and each hardware retrieval by the RNIC 208 or 222 may be performed in a more efficient manner because the WRs may be handled as a burst of WRs instead of individual retrievals on the I/O bus. By grouping the WRs together, the I/O bus may utilize fewer I/O cycles. The operation of a work request list is explained in greater detail with respect to FIG. 3.

Figure 3:
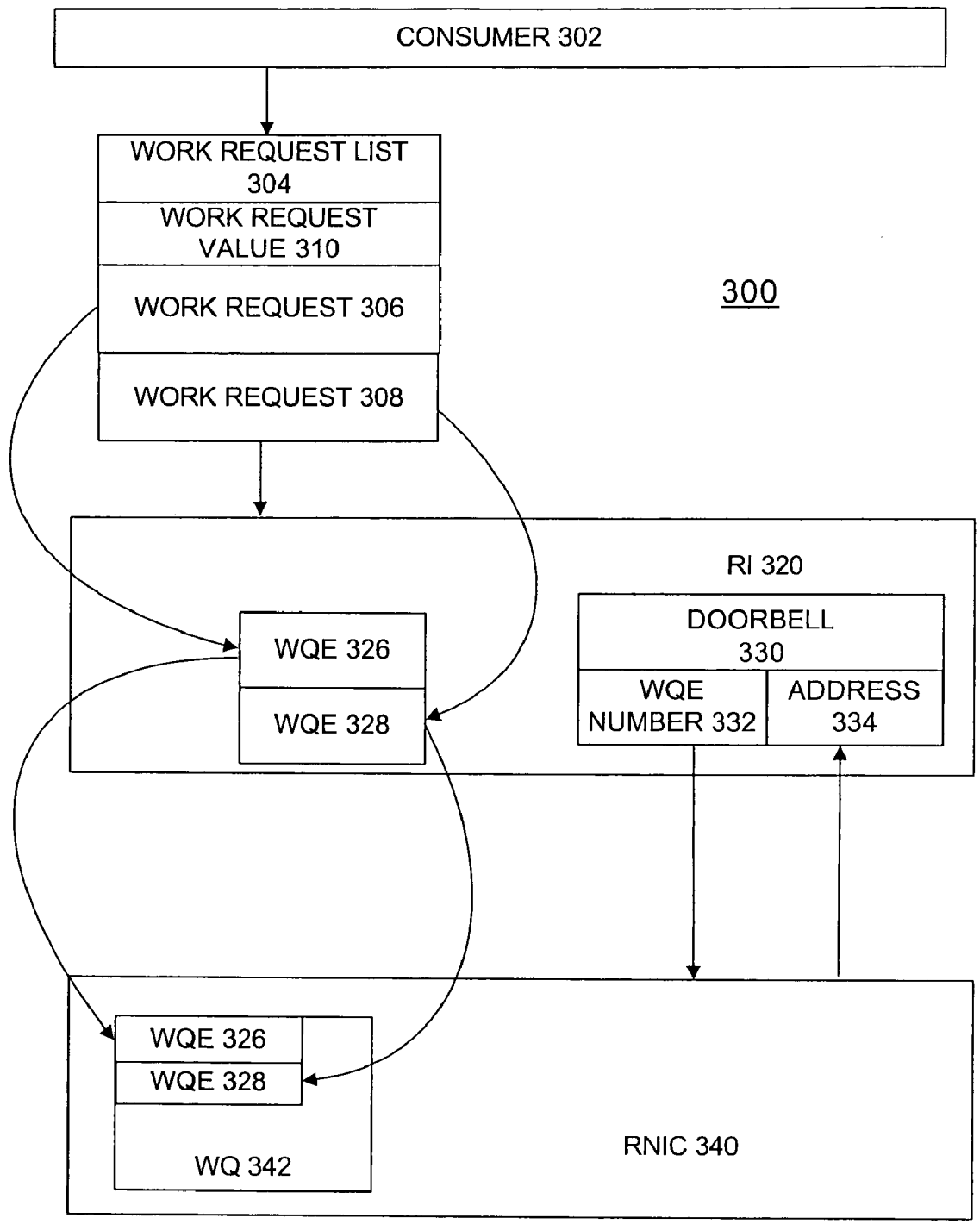
FIG. 3 illustrates a block diagram showing the processing of a work request and a work request list in accordance with embodiments of the present invention.

FIG. 3 is a block diagram showing the processing of a work request and a work request list in accordance with embodiments of the present invention. The diagram is generally referred to by the reference numeral 300. A consumer 302, such as consumer 206 or 220 of FIG. 2, issues a work request list 304 to a RI 320, such as RI 207 or 221 of FIG. 2. The WRL 304 includes a first WR 306 and a second WR 308, which corresponds to two verbs being issued to the RNIC 340 for a memory operation. The first WR 306 and the second WR 308 may include a user-defined work request identification, a scatter/gather list ("SGL"), a number of SGL elements or entries, and other information to support the command being issued. The work request value 310 may indicate the number of WRs that are included within the WRL 304.

To communicate the commands in the WRL 304, the RI 320 may communicate the commands to the RNIC 340. For instance, the RI 320 may convert the WRL 304 into mulitple WQEs, which may each comprise a first WQE 326 and a second WQE 328. The first WQE 326 may correspond to an internal representation of WR 306, while the second WE 328 may correspond to an internal representation of the WR 308. The RI 320 enqueues the WQEs 326 and 328 in the work queue ("WQ") 342, which may correspond to the send queues 210 or 224 or the receive queues 212 or 226 of FIG. 2. These WQEs 326 and 328 may be placed into the WQ 342 in the same order within the WRL 304.

To perform the commands based on the WRL 304, the RI 320, notifies the RNIC 340 through the use of a doorbell 330. The RI 320 rings a doorbell 330 to notify the RNIC 340 that it has WQEs 326 and 328 in the WQ 342. The doorbell 330 may include a WQE number 332 and an address 334. The WQE number 332 may indicate the number of WQEs that are posted to the WQ 340. The number may correspond to a value of "1" or a value up to the maximum allowable value for a WRL, which may be the number of elements permitted in the WQ 342. By using a WRL 304, a single doorbell 330 may be issued for the WQEs 326 and 328 if the RI 320 is able to handle the WRL 304. For instance, if the doorbell is used to indicate two WQEs 326 and 328, the WQE number 332 may represent the value of "2."

The use of work request lists may enhance the operation of the system by allowing multiple WRs to be combined into a single WRL, such as the WRL 304. By using the WRL 304, the RI 320 and the RNIC 340 may improve the posting of mulitple WQEs 326 and 328 because the RNIC 340 may retrieve multiple WQEs with a single I/O cycle or fewer I/O cycles. This allows the software to run more efficiently and the hardware to utilize the I/O bus in a more efficient manner. Also, the consumer 302 may manage the ordering of the WQEs 326 and 328 enqueued on the WQ 342. This ordering may ensure that the WQEs presented in a specific order set within the WRL 304. Accordingly, the consumer 302 may submit a list of WRs 306 and 308 that correspond to logical units of work to be performed. This may enhance the operation of the consumer 302 and the RNIC 340.

In an alternative embodiment, the doorbell 330 may be rung for each of the WQEs 326 and 328 that are posted to the WQ 342. If the doorbell 330 is used to indicate the posting of a single WQE, then the WQE number 332 may represent the value of "1." This embodiment may allow the consumer 302 to manage the ordering of the WQEs 326 and 328 enqueued on the WQ 342, as discussed above. This ordering may allow the WQEs 326 and 328 to be posted in a specific order set within the WRL 304, which may enhance the operation of the consumer 302 and the RNIC 340.

Figure 4:
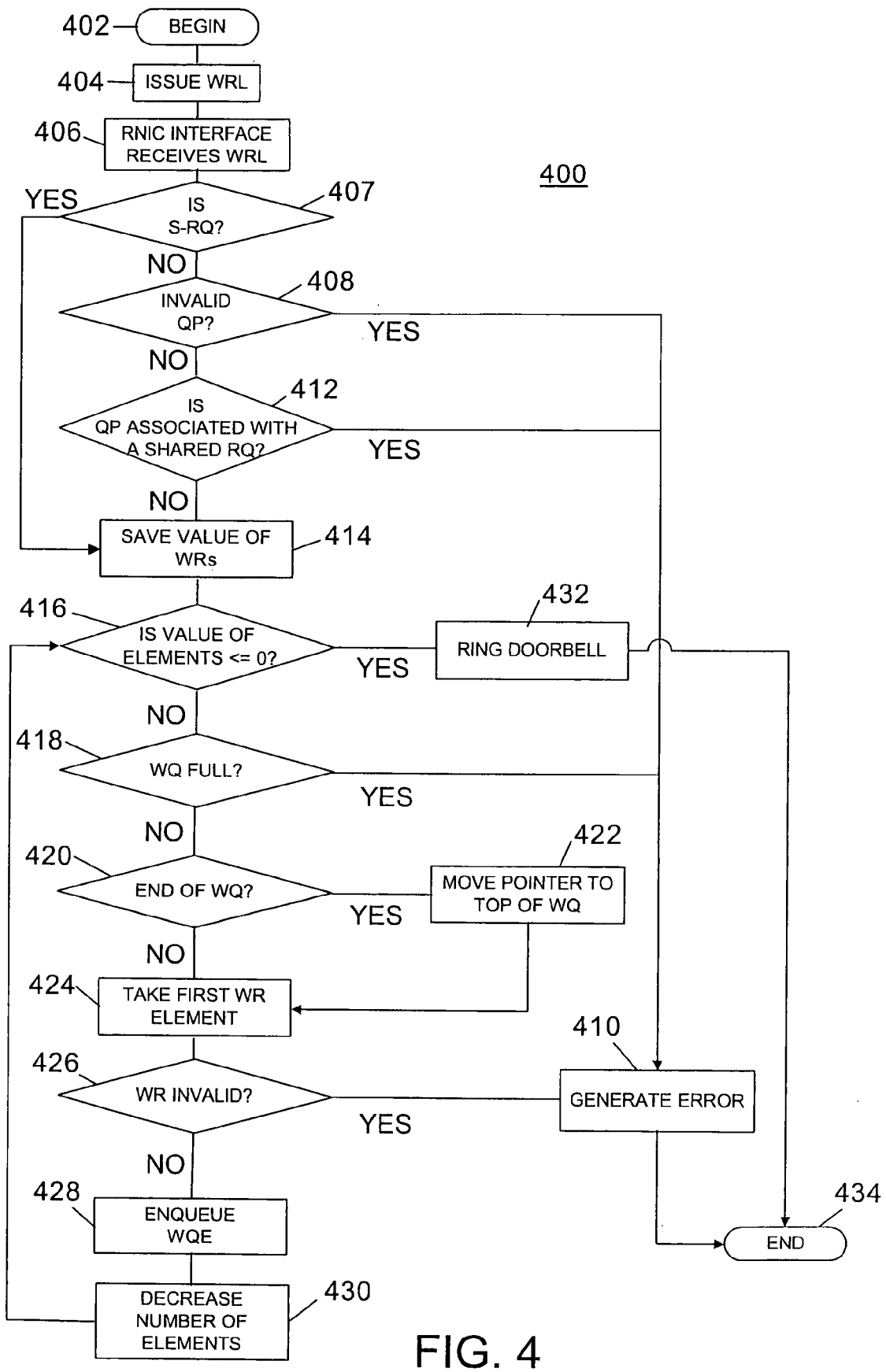
FIG. 4 is a process flow diagram that illustrates a process flow that may be used to implement work request lists in accordance with embodiments of the present invention.

FIG. 4 is a process flow diagram that illustrates a process flow that may be used to implement work request lists in accordance with embodiments of the present invention In the diagram, generally referred to by reference numeral 400, a work request list, such as the WRL 304 (FIG. 3), is utilized by an RNIC interface, such as the RI 320 (FIG. 3). The process begins at block 402. At block 404, a consumer, such as consumer 302 (FIG. 3), issues a WRL 304 that may include multiple WRs, such as WR 306 and 308. Each work request corresponds to an operation or command to be performed by an RNIC, such as the RNIC 340 (FIG. 3).

At block 406, the RI 320 receives the WRL 304 and begins to process it to create the WQEs 326 and 328 from the respective WRs 306 and 308. The RI processing of the WRL 304 may involve an error detection phase, a queuing phase, and a notification phase. The error detection phase includes blocks 407-412, which may operate to determine if the WRL 304 is an invalid command. For instance, at block 407, the RI 320 may determine if the request relates to a shared RQ ("S-RQ"). If the request relates to a S-RQ, then an RI 320 may save a number of elements E to be enqueued at block 414. However, if the request does not relate to a S-RQ, then the RI 320 assumes the WRL is intended for a QP and determines if the QP is valid, as shown at block 408. At block 408, the RI 320 may determine if the subject QP is valid for the request. If the QP is invalid, then an error is generated to the consumer at block 410. However, if the QP is valid, then the RI 320 determines if the QP is associated with a shared receive queue (RQ), as shown at block 412. If the QP is associated with a shared RQ, then an error is generated at block 410. However, if the QP is not associated with a shared RQ, then the number of WRs in the WRL 304 may be saved into a temporary register or file as a number of elements E to be enqueued, as shown at block 414.

Once error detection blocks have been passed, the WRL 304 may enter the queuing stage to enqueue the WRs 306 and 308 into a WQ 342. At block 416, the RI 320 may determine if the number of elements E is less than or equal to zero. If the number of elements E is greater than 0, then the RI 320 may determine if a WQE 326 or 328 may be added to the WQ 342 at block 418. If the WQ 342 is full, then an error may be generated to the RI at block 410, which indicates the number of WRs (WRs-E) that were added to the WQ 342. However, if the RI 320 is able to add another WQE 326 or 328 to the WQ 342, then the RI 320 determines if the WQ is at the end of the queue, as shown at block 420. If the WQ is not at the end of the WQ 342, then the RI 320 may take the first WR from the WRL 304, as shown at block 424. However, if the WQ is at the end of the WQ 342, then the RI 320 may move the pointer to the top of the WQ 342, as shown at block 422. Once the pointer is moved to the beginning of the WQ 342, the RI may take the first WR 306 or 308 from the WRL 304, as shown at block 424.

At block 426, the RI 320 determines if WQE 326 or 328 is valid or invalid. This determination may include verifying the SGL, the length, operation code, and other fields within the WQE 326 or 328. If the WQE 326 or 328 is invalid, then the RI 320 may generate an error to the consumer 302. However, if the WQE 326 or 328 is valid, then the RI 320 enqueues the WQE 326 or 328 into the WQ 342, as shown at block 428. After the WQE 326 or 328 is enqueued in the WQ 342, the number of elements E may be decreased by an element, as shown at block 430. After the number of elements E is decreased, process flow may return to block 416 to continue processing the WRL 304.

However, if the number of elements E at block 416 is less than or equal to zero, then the RI 320 may begin the notification phase, as shown at block 432. In the notification phase, the RI 320 may ring the doorbell for the RNIC 340 to notify the RNIC 340 that WQEs 326 and 328 are posted to the WQ 342. The ringing of the doorbell may comprise sending a signal to a specific address or sending a message to the RNIC 340. Accordingly, after the generation of an error at block 410 or the notification of the RNIC 340 at block 432, the process ends at block 434.

Figure 5:
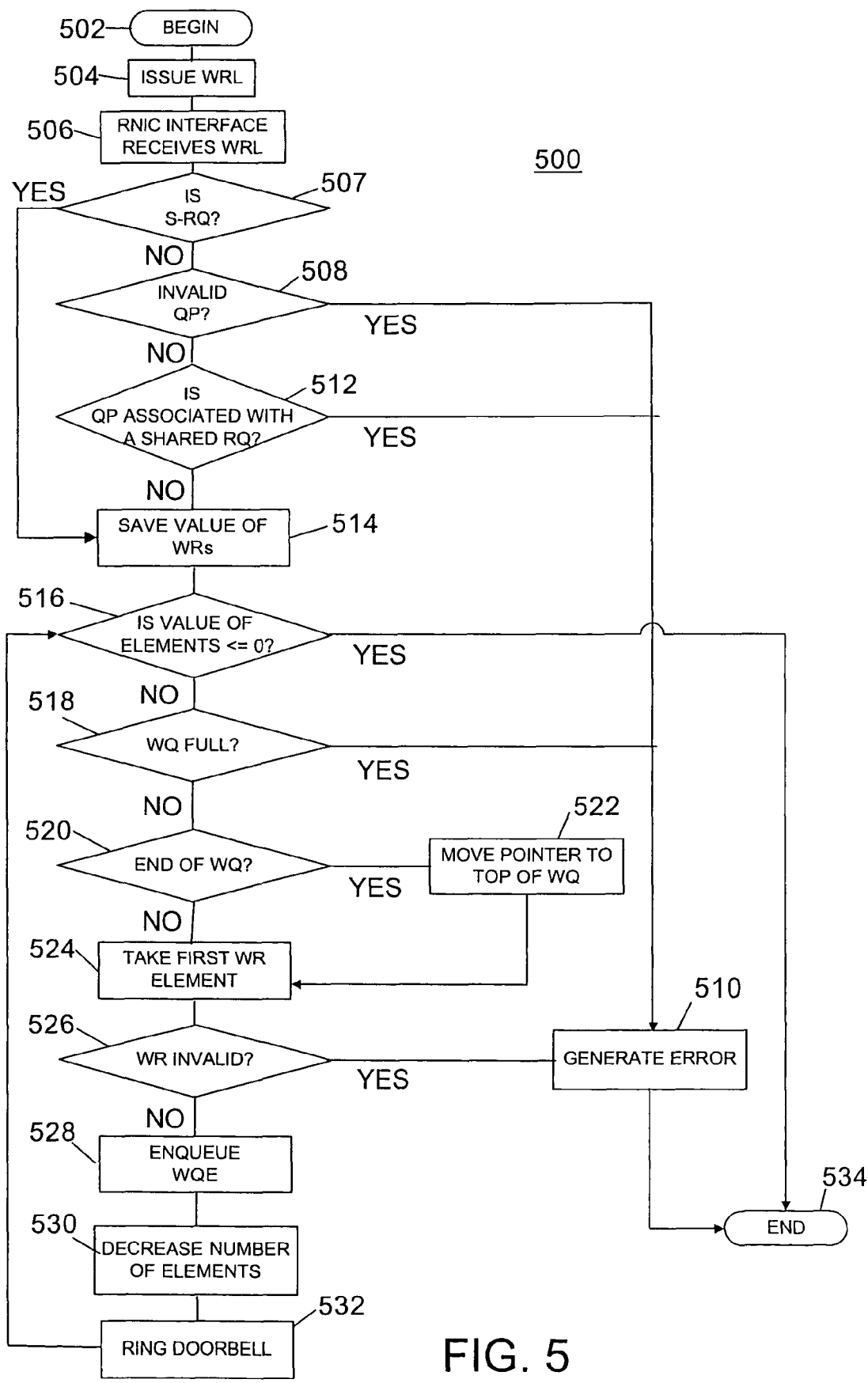
FIG. 5 is an alternative process flow diagram that illustrates a process flow that may be used to implement work request lists in accordance with embodiments of the present invention.

FIG. 5 is an alternative process flow diagram in accordance with embodiments of the present invention. The process shown in FIG. 5 illustrates the use of individual notifications for each of the WRs 306 or 308 in the WRL 304. In the diagram, generally referred to by reference numeral 500, a work request list is utilized by the RNIC interface to enhance the operation of the system. The process begins at block 502. At block 504, a consumer issues a WRL 304 that may include multiple WRs 306 and 308. Each of the WRs corresponds to operations or commands to be performed by an RNIC, such as the RNIC 340 (FIG. 3).

At block 506, the RI 320 receives the WRL 304 and begins to process the WRL 304 to create the WQEs 326 and 328 from the respective WRs 306 and 308. The RI processing of the WRL 304 may involve an error detection phase and a queuing/notificaiton phase. The error detection phase may include blocks 507-512, which may operate to determine if the WRL 304 comprises an invalid command. For instance, at block 507, the RI 320 may determine if the request relates to a shared RQ ("S-RQ"). If the request relates to a S-RQ, then the RI 320 may save a number of elements E to be enqueued at block 514. However, if the request does not relate to a S-RQ, then the RI 320 assumes the WRL is intended for a QP and determines if the QP is valid, as shown at block 508. At block 508, the RI 320 may determine if the QP is valid for the request. If the QP is invalid, then an error is generated to the consumer at block 510. However, if the QP is valid, then the RI 320 may determine if the QP is associated with a shared receive queue (RQ), as shown at block 512. If the QP is associated with a shared RQ, then an error is generated at block 510. However, if the QP is not associated with a shared RQ, then the number of the WRs in the WRL 304 may be saved as a number of elements E to be enqueued, as shown at block 514.

Once error detection blocks have been passed, the WRL 304 may enter the queuing stage to enqueue the WRs 306 and 308 into a WQ 342. At block 516, the RI 320 determines if the number of elements E is less than or equal to zero. If the number of elements E is greater than 0, then the RI 320 determines whether a WQE 326 or 328 may be added to the WQ 342, as shown at block 518. If the WQ is full, then an error is generated to the RI, as shown at block 510. However, if the RI 320 is able to add another WQE 326 or 328 to the WQ 342, then the RI 320 may determine if the WQ is at the end of the queue, as shown at block 520. If the WQ is not at the end of the WQ 342, then the RI 320 may take the first WR 306 or 308 from the WRL 304, as shown at block 524. However, if the WQ is at the end of the WQ 342, then the RI 320 may move the pointer to the top of the WQ 342, as shown at block 522. Once the pointer is moved to the beginning of the WQ 342, the RI may take the first WR 306 or 308 from the WRL 304, as shown at block 524.

At block 526, the RI 320 determines if WQE 326 or 328 is valid or invalid. This determination may include verifying the SGL, the length, operation code, and other fields within the WQE 326 or 328. If the WQE 326 or 328 is invalid, then the RI 320 generates an error to the consumer 302. However, if the WQE 326 or 328 is valid, then the RI 320 enqueues the WQE 326 or 328 into the WQ 342, as shown at block 528. After the WQE 326 or 328 is in the WQ 342, the number of elements E may be decreased by an element, as shown at block 530. At block 532, the RI 320 may ring the doorbell for the RNIC 340 to notify the RNIC 340 that WQEs 326 and 328 are posted to the WQ 342. After the notification of the RNIC 340, process flow returns to block 516 to continue processing the WRL 304.

However, if the number of elements E at block 516 is less than or equal to zero, then the RI 320 may have finished the enqueuing and notification for the process. As such, the process ends at block 534 after the generation of an error at block 510 or the number of elements at block 516 is less than or equal to zero.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus that employs a work request list to access a memory device, the apparatus comprising:

the memory device that is adapted to be accessed by a remote network interface;

an upper layer protocol that generates the work request list comprising a plurality of work requests, the work request list having an attribute that indicates the number of the plurality of work requests in the work request list wherein each of the plurality of work requests is enqueued as a work queue element, and wherein each of a plurality of work queue elements is retrieved with fewer I/O cycles than individual retrieval of work requests; and an interface that is adapted to receive the work request list and individually enqueue the plurality of work requests;

wherein the interface is adapted to ring a doorbell upon enqueuing all of the plurality of work requests.

2. The apparatus set forth in claim 1, wherein the interface comprises a remote direct memory access interface.

3. The apparatus set forth in claim 1, wherein the interface comprises a remote direct memory access network interface card ("RNIC").

4. The apparatus set forth in claim 1, wherein the work request list indicates an order in which each of the plurality of work requests is to be enqueued.

5. A network, comprising:
a first system having a first consumer and at least one input/output device;
a second system having a second consumer and at least one input/output device;
a switch network that connects the first and second systems for communication; and
wherein each of the systems comprises an apparatus for implementing work request lists to permit communication between the input/output device of the first system and the input/output device of the second system, the apparatus for implementing work request lists comprising:
a consumer that generates the work request list comprising a plurality of work requests, the work request list having an attribute that indicates the number of the plurality of work requests in the work request list wherein each of the plurality of work requests is enqueued as a work queue element, and wherein the consumer retrieves each of a plurality of work queue elements with fewer I/O cycles than individual retrieval of work requests; and an interface that is adapted to receive the work request list and individually enqueue the plurality of work requests;

wherein the interface is adapted to ring a doorbell upon enqueuing all of the plurality of work requests.

6. The network set forth in claim 5, wherein the interface comprises a remote direct memory access interface.

7. The network set forth in claim 5, wherein the interface comprises a remote direct memory access network interface card ("RNIC").

8. The network set forth in claim 5, wherein the work request list indicates an order in which each of the plurality of work requests is to be enqueued.

9. A method for accessing a memory device, the method comprising the steps of:
generating a work request list comprising a plurality of work requests;
assigning an attribute that indicates the number of the plurality of work requests in the work request list;
enqueuing the plurality of work requests as a work queue element;
retrieving each of a plurality of work queue elements with fewer I/O cycles than individual retrieval of work requests;
receiving the work request list and individually enqueuing the plurality of work requests; and
ringing a doorbell to indicate that all of the plurality of work requests have been enqueued.

10. The method set forth in claim 9, comprising the step of indicating an order in which each of the plurality of work requests is to be enqueued.

11. The method set forth in claim 9, wherein the recited steps are performed in the recited order.

* * * * *